(12) United States Patent
Kim et al.

(10) Patent No.: US 10,763,467 B2
(45) Date of Patent: Sep. 1, 2020

(54) BATTERY MODULE

(71) Applicant: LG CHEM, LTD., Seoul (KR)

(72) Inventors: Hyung-Kyu Kim, Daejeon (KR);
Sang-Yoon Jeong, Daejeon (KR);
Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/759,279

(22) PCT Filed: Oct. 20, 2016

(86) PCT No.: PCT/KR2016/011843
§ 371 (c)(1),
(2) Date: Mar. 12, 2018

(87) PCT Pub. No.: WO2017/078306
PCT Pub. Date: May 11, 2017

(65) Prior Publication Data
US 2018/0190952 A1    Jul. 5, 2018

(30) Foreign Application Priority Data

Nov. 5, 2015 (KR) .................. 10-2015-0155188

(51) Int. Cl.
*H01M 2/08* (2006.01)
*H01M 2/02* (2006.01)
(Continued)

(52) U.S. Cl.
CPC ............ *H01M 2/08* (2013.01); *H01M 2/021* (2013.01); *H01M 2/1077* (2013.01); *H01M 2/20* (2013.01);
(Continued)

(58) Field of Classification Search
None
See application file for complete search history.

(56) References Cited

U.S. PATENT DOCUMENTS 6,451,476 B1    9/2002  Chang et al.
9,214,650 B2   12/2015  Lee et al.
(Continued)

FOREIGN PATENT DOCUMENTS

CN        1819318 A    8/2006
CN      201233924 Y    5/2009
(Continued)

OTHER PUBLICATIONS

International Search Report (PCT/ISA/210) issued in PCT/KR2016/011843, dated Jan. 16, 2011.
(Continued)

*Primary Examiner* — Maria Laios
*Assistant Examiner* — Angela J Martin
(74) *Attorney, Agent, or Firm* — Birch, Stewart, Kolasch & Birch, LLP (57) ABSTRACT

The present disclosure relates to a battery module suitable for minimizing increase in overall volume due to increased capacity and simplifying the connection structure of the battery cells, by surrounding battery cells with a battery receiving unit and a battery cover as substitutes for cartridges. The battery module of the present disclosure includes a battery receiving unit including, within a receiving housing, a receiving groove and a receiving structure having a zigzag shape on a receiving sidewall and surrounding the receiving groove, battery cells partially received in the receiving groove and contacted with the receiving structure, and including electrode leads protruded from the receiving housing; and a battery cover including a seating groove formed within a seating housing and open to the receiving groove for seating the battery cells, and a seating structure having a zigzag shape on a seating sidewall surrounding the seating groove, in which the seating housing
(Continued)

covers the receiving groove of the receiving housing and is penetrated with the electrode leads.

15 Claims, 5 Drawing Sheets

(51) Int. Cl.
- *H01M 2/10* (2006.01)
- *H01M 2/20* (2006.01)
- *H01M 10/64* (2014.01)
- *H01M 10/42* (2006.01)
- *H01M 10/60* (2014.01)
- *H01M 10/52* (2006.01)
- *H01M 10/647* (2014.01)

(52) U.S. Cl.
CPC ....... *H01M 2/206* (2013.01); *H01M 10/4207* (2013.01); *H01M 10/52* (2013.01); *H01M 10/647* (2015.04); *H01M 10/60* (2015.04); *H01M 2220/20* (2013.01)

(56) References Cited

U.S. PATENT DOCUMENTS

| | | | |
|---|---|---|---|
| 9,246,200 | B2 | 1/2016 | Kang et al. |
| 9,484,592 | B2 | 11/2016 | Roh et al. |
| 2007/0281208 | A1 | 12/2007 | Yoon et al. |
| 2012/0015226 | A1 | 1/2012 | Kim et al. |
| 2012/0171532 | A1 | 6/2012 | Lee et al. |
| 2013/0244066 | A1* | 9/2013 | Kang ................... H01M 10/647 429/62 |
| 2014/0127551 | A1 | 5/2014 | Kim |
| 2015/0064540 | A1* | 3/2015 | Roh ..................... H01M 2/1077 429/153 |
| 2016/0036017 | A1* | 2/2016 | Seong ................... H01M 2/021 429/100 |

FOREIGN PATENT DOCUMENTS

| | | | | |
|---|---|---|---|---|
| CN | 102714337 | A | 10/2012 | |
| JP | 2008-103139 | A | 5/2008 | |
| JP | 2011-171114 | A | 9/2011 | |
| JP | 2011-171245 | A | 9/2011 | |
| JP | 2014-93240 | A | 5/2014 | |
| JP | 2015-133289 | A | 7/2015 | |
| KR | 10-2011-0093703 | A | 8/2011 | |
| KR | 10-2012-01351237 | A | 5/2012 | |
| KR | 10-2013-0005528 | A | 1/2013 | |
| KR | 10-2013-0066651 | A | 6/2013 | |
| KR | 1020130066651 | * | 6/2013 | ........ H01M 10/6552 |
| KR | 10-2013-0137299 | A | 12/2013 | |
| KR | 10-2013-0142398 | A | 12/2013 | |
| KR | 1020130137299 | * | 12/2013 | ............ H01M 10/50 |
| KR | 10-2014-0042059 | A | 4/2014 | |
| KR | 10-2014-0070857 | A | 6/2014 | |
| KR | 10-2014-0141825 | A | 12/2014 | |
| TW | I475740 | B | 3/2015 | |
| WO | WO 2008/078586 | * | 7/2008 | ............ H01M 10/50 |
| WO | WO 2008/078586 | A1 | 7/2008 | |
| WO | WO 2015/060528 | * | 4/2015 | ............. H01M 2/21 |
| WO | WO 2015/060528 | A1 | 4/2015 | |

OTHER PUBLICATIONS

English language translation of Taiwan IPO Search Report for Taiwan Invention Patent Application No. 105135956 dated Mar. 16, 2020.

\* cited by examiner

BATTERY MODULE

TECHNICAL FIELD

The present application claims priority to Korean Patent Application Nos. 10-2015-0155188 filed on Nov. 5, 2015 in the Republic of Korea, the disclosure of which is incorporated herein by reference in its entirety.

The present disclosure relates to a battery module suitable for substituting cartridges positioned between heating elements, with a configuration that surrounds sequentially-stacked heating elements in a bundle.

BACKGROUND ART

Recently, vehicles are manufactured based on studies conducted to secure driving force using internal combustion engines and/or electric motors, in order to reduce air pollution from exhaust gas of vehicles. Accordingly, the vehicles have evolved in the order of hybrid vehicles, plug-in hybrid vehicles and electric vehicles. In this case, the hybrid vehicles and plug-in hybrid vehicles have an internal combustion engine, an electric motor and a battery pack, and the electric vehicles have an electric motor and a battery pack, but not an internal combustion engine.

Accordingly, the battery pack has evolved in the order of hybrid vehicles, plug-in hybrid vehicles and electric vehicles. The battery pack is configured to be charged by using an external electrical power from the electric vehicles or an internal electrical power of the electrical vehicles. The battery pack described above includes a battery module including cartridges and battery cells. The cartridges may be sequentially stacked in the battery module. The battery cells are positioned between the cartridges. In this case, the cartridges are configured to fix the battery cells within the battery module and protect the battery cells from external impacts.

Further, the cartridges are configured with cooling fins to cool the battery cells during charging and discharging of the battery cells and configured to facilitate electric connection of the battery cells by using a structural shape. That is, in the battery module mentioned above, the cartridge has various utilization with respect to the battery cells. Accordingly, many studies are conducted with respect to coupling relations the cartridge and neighboring elements for the battery cell. One example of the above studies is disclosed in Korean Patent Publication No. 10-2014-0042059, published on Apr. 7, 2014, titled "Cell Cartridge for Battery Module and Battery Module using the same."

The battery module has cell cartridges, cells, and heat sinks. The cell cartridges are arranged sequentially in the battery module. The cells are encased in the cell cartridges. The heat sinks are interposed between the cell cartridges. In an example, the cartridges mentioned above have a cushion member formed of a rubber member in a rectangular frame. The cushion member may support an edge of the neighbored cell by partially penetrating an edge of the heat sink and press force on a sealing part of the neighbored cell. That is, the cushion member supports the cell stably on the cartridge against vibration of the cartridge or the battery module caused from external impacts.

However, as the battery module has gradually achieved high capacity, the battery module needed an increasing number of cells and cell cartridges for seating the cells. Accordingly, the cell cartridges increase volume of the battery pack as well as the battery module in response to the development of high-capacity battery modules. Further, such increase in a number of cell cartridges requires repeated use of a screw member for aligning the cell cartridges in the battery module.

DISCLOSURE

Technical Problem

The present disclosure is designed to solve the problems of the related art, and therefore the present disclosure is directed to providing a battery module suitable for minimizing increase in the overall volume due to increased capacity and implementing a simple structure in a periphery of the battery cell, by providing a substitute for the cartridges to seat a battery cell.

Technical Solution

In one aspect of the present disclosure, there is provided a battery module including a battery receiving unit including a receiving groove positioned within a receiving housing and open to one side of the receiving housing and including a receiving structure along a zigzag shape of a receiving sidewall surrounding the receiving groove, battery cells received in the receiving groove and contacting the receiving structure, and including electrode leads positioned toward the one side of the receiving housing and protruding from the receiving housing, and a battery cover including a seating groove formed within a seating housing and open to the receiving groove for seating the battery cells, and including a seating structure along a zigzag shape of a seating sidewall surrounding the seating groove, in which the seating housing covers the one side of the receiving housing and is penetrated with the electrode leads.

According to the present disclosure, the receiving housing may close the receiving groove on other side facing the one side.

Preferably, a length of the receiving groove of the receiving housing may be greater than a length of the seating groove of the seating housing.

According to the present disclosure, the receiving sidewall of the receiving housing may have the zigzag shape from a bottom of the receiving housing to a ceiling.

Preferably, the receiving sidewall of the receiving housing may include a first receiving sidewall and a second receiving sidewall, which face each other through the receiving groove, and a third receiving sidewall on other side facing the one side of the receiving housing, and the receiving structure may include receiving sloped surfaces positioned along the zigzag shape of the first receiving sidewall, the second receiving sidewall and the third receiving sidewall and receiving slits respectively positioned on curved portions between the receiving sloped surfaces.

According to the present disclosure, the receiving sloped surfaces may be separated between the first receiving sidewall, the second receiving sidewall and the third receiving sidewall.

In one aspect, the receiving sloped surface of the first receiving sidewall may have a same width as the receiving sloped surface of the second receiving sidewall and the receiving sloped surface of the third receiving sidewall, at one level within the receiving groove.

In another aspect, a width between the first receiving sidewall and the second receiving sidewall may have a smaller size than a length of the receiving sloped surface of the third receiving sidewall.

In another aspect, the receiving sloped surfaces may be exposed to the receiving groove so as to face the receiving groove, and the receiving slits may communicate fluidly with the receiving groove.

According to the present disclosure, the battery cells may position an electrode assembly between the two receiving sloped surfaces defining one curved portion in each of the first receiving sidewall, the second receiving sidewall and the third receiving sidewall, and include a sealing part in one receiving slit.

The sealing part may be fit into the receiving slits of the first receiving sidewall, the second receiving sidewall and the third receiving sidewall through a folded portion, and fit into the receiving slits of the third receiving sidewall through a flat portion.

According to the present disclosure, the seating sidewall of the seating housing may have the zigzag shape from a bottom of the seating housing to a ceiling.

Preferably, the seating housing may include a first seating sidewall and a second seating sidewall, which face each other through the seating groove, and a third seating sidewall facing an open surface of the seating groove, and the seating structure may include seating sloped surfaces positioned along the zigzag shape on the first seating sidewall, the second seating sidewall and the third seating sidewall, and seating slits respectively positioned on curved portions between the seating sloped surfaces.

According to the present disclosure, the seating sloped surfaces may be separated between the first seating sidewall, the second seating sidewall and the third seating sidewall.

Preferably, the seating sloped surface of the first seating sidewall may have a same width as the seating sloped surface of the second seating sidewall and the seating sloped surface of the third seating sidewall at one level within the seating groove.

In one aspect, a width between the first seating sidewall and the second seating sidewall may have a smaller size than a length of the seating sloped surface of the third seating sidewall.

In another aspect, the seating sloped surfaces may be exposed to the seating groove so as to face the seating groove, and the seating slits may communicate fluidly with the seating groove.

According to the present disclosure, the battery cell may position the electrode assembly between the two seating sloped surfaces defining one curved portion in each of the first seating sidewall, the second seating sidewall and the third seating sidewall, and include a sealing part in the one seating slit.

Preferably, the sealing part may be inserted into the seating slits of the first seating sidewall, the second seating sidewall, and the third seating sidewall with a folded portion, and inserted into the seating slit of the third seating sidewall with a flat portion.

Meanwhile, the seating housing may additionally include through holes communicating fluidly with the seating slits and penetrating the third seating sidewall between the seating sloped surfaces of the third seating sidewall, the through holes may have a same number as the electrode leads, and the electrode leads may be respectively inserted into the through holes and may protrude from the third seating sidewall.

Selectively, the battery receiving unit and the battery cover may be formed of a natural rubber, a synthetic rubber, an elastomer, or a plastomer.

Selectively, the battery receiving unit and the battery cover may be formed of a metal material.

Advantageous Effects

The present disclosure gives the following effects. A battery module according to the present disclosure can minimize increase in the overall volume due to increased capacity, by providing a battery receiving unit and a battery cover formed of a rubber material and surrounding the battery cells with the battery receiving unit and the battery cover, thus eliminating need for using cartridges as many as battery cells.

The battery module according to the present disclosure can simplify the connection structure of the battery cells externally from the battery receiving unit and the battery cover because the battery cells are closely surrounded by using the battery receiving unit and the battery cover as substitutes for the cartridges, and electrode leads of the battery cells are penetrated through the battery cover.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the embodiments disclosed hereinafter, a battery cell refers to a lithium secondary battery. The "lithium secondary battery" as used herein encompasses a secondary battery in which lithium ions act as operating ions and thereby inducing electrochemical reaction in a positive electrode and a negative electrode during charging and discharging. However, the present disclosure is obviously not limited to the types of batteries.

Figure 1:
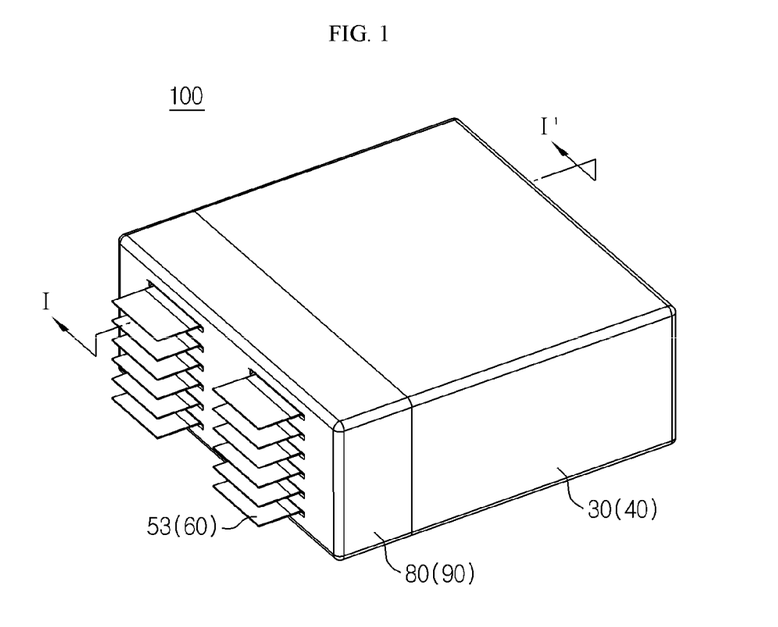
FIG. 1 is a perspective view illustrating a battery module according to an embodiment.
Figure 2:
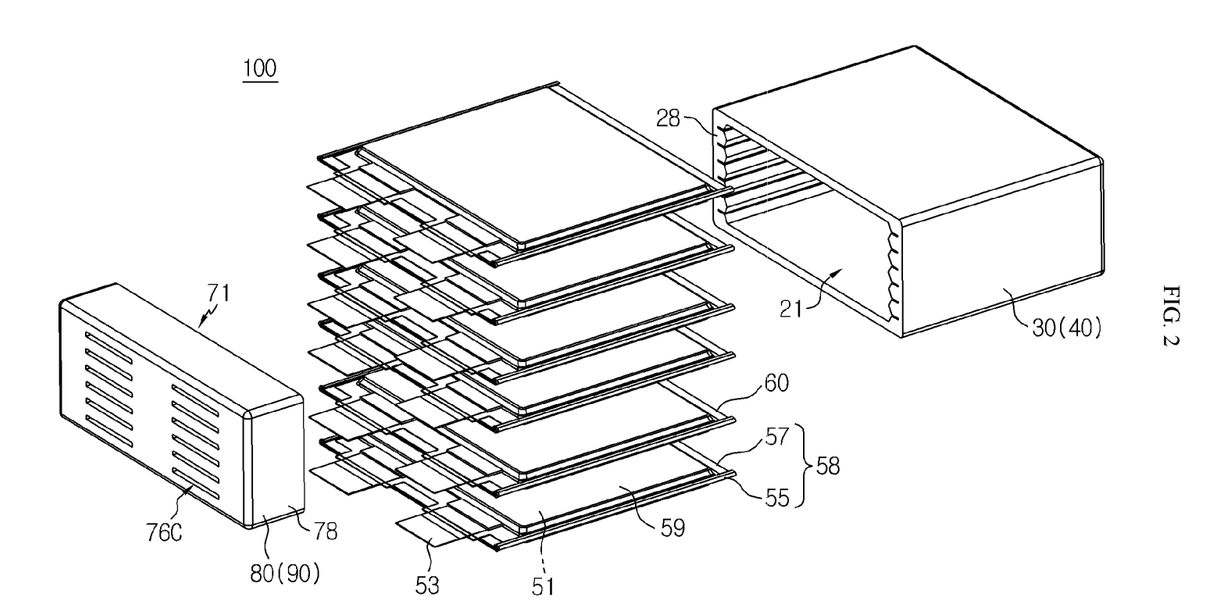
FIG. 2 is an exploded perspective view of the battery module of FIG. 1.

FIG. 1 is a perspective view illustrating a battery module according to an embodiment, and FIG. 2 is an exploded perspective view illustrating the battery module of FIG. 1.

Referring to FIGS. 1 and 2, the battery module 100 includes a battery receiving unit 40, battery cells 60, and a battery cover 90. The battery receiving unit 40 may define a receiving groove 21 open to one side, and include a receiving housing 30 having a zigzag shape on a receiving sidewall 28 surrounding the receiving groove 21, as illustrated in FIG. 2. The receiving housing 30 may receive battery cells 60 through the receiving groove 21 and the receiving sidewall 28 having a zigzag shape.

Preferably, the battery receiving unit 40 may be formed of a natural rubber, a synthetic rubber, an elastomer or a plastomer, although not limited hereto. Accordingly, the battery receiving unit 40 may be formed of a metal material.

Referring to FIG. 2, the battery cell 60 may include an electrode assembly 51, two electrode leads 53, and a pouch exterior material 59. The electrode assembly 51 and the electrode leads 53 within the pouch exterior material 59 may be electrically connected.

The pouch exterior material 59 may seal the electrode assembly 51 and some of the electrode leads 53, and expose the other electrode leads 53 externally. Preferably, the pouch exterior material 59 may include a sealing part 58 on a periphery of the electrode assembly 51. The sealing part 58 may be formed of a folded portion 55 directing toward a center region of the pouch exterior material 59, and a flat portion 57.

In an example, each of the battery cells 60 may be received by the receiving groove 21 of the receiving housing 30 through the sealing part 58 and the electrode assembly 57, and contacted with the receiving sidewall 28 of the receiving housing 30 through the sealing part 58. Preferably, the battery cells 60 may be stacked sequentially in the receiving groove 21 of the receiving housing 30. In one aspect, the battery cells 60 may be a pouch type.

Figure 4:
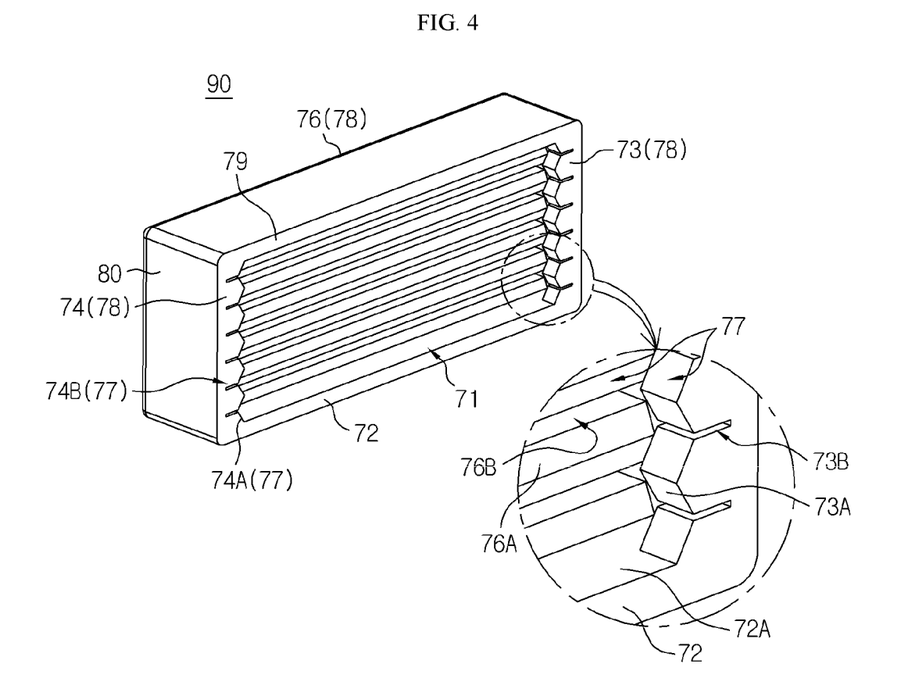
FIG. 4 is a perspective view illustrating the battery cover of FIG. 2.

The battery cover 90 may cover the receiving groove 21 of the battery receiving unit 40. Preferably, the battery cover 90 may define a seating groove 71 therein and include a seating housing 80 having a zigzag shape on a seating sidewall 78 surrounding the seating groove 71, as illustrated in FIG. 4. The seating housing 80 may have through holes 76C opposite the seating groove 71, as illustrated in FIG. 2. The through holes 76C may communicate fluidly with the seating groove 71.

Further, the seating housing 80 may seat the battery cells 60 through the seating groove 71 and the seating sidewall 78 having a zigzag shape, and externally expose the electrode leads 53 through the through holes 76C.

In one aspect, the battery cover 40 may be formed of a natural rubber, a synthetic rubber, an elastomer or a plastomer. But, it may not be limited hereto, and accordingly, the battery cover 40 may be also formed of a metal material.

Figure 3:
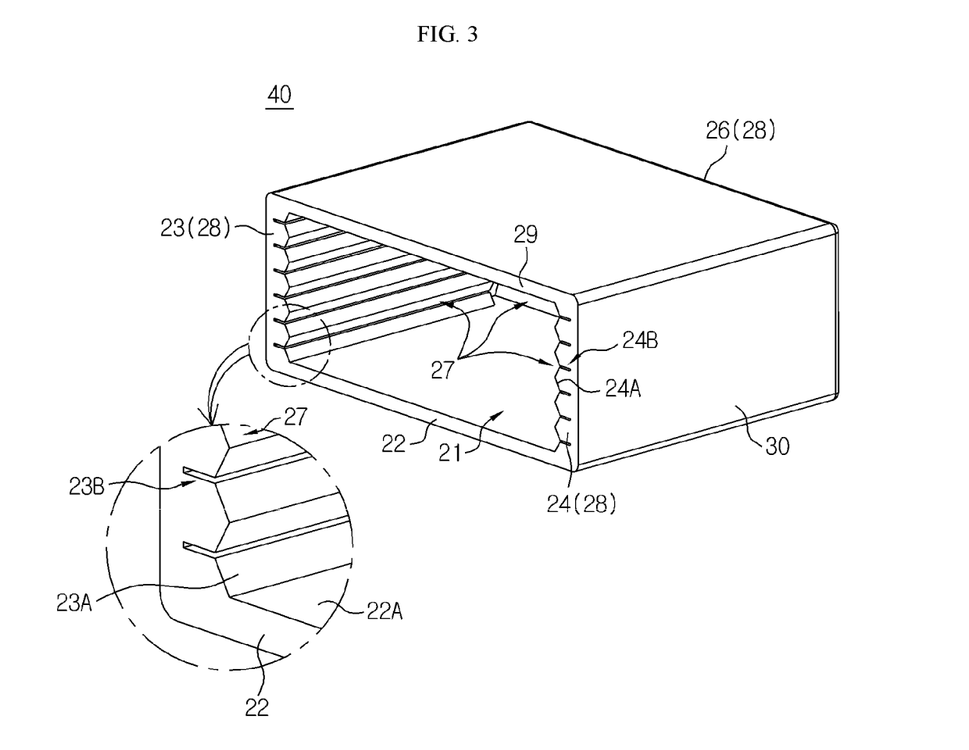
FIG. 3 is a perspective view illustrating the battery receiving unit of FIG. 2.

FIG. 3 is a perspective view illustrating the battery receiving unit of FIG. 2, and FIG. 4 is a perspective view illustrating the battery cover of FIG. 2.

Referring to FIG. 3, the battery receiving unit 40 may have the receiving groove 21 positioned within the receiving housing 30 and open to one side of the receiving housing 30, and have a receiving structure 27 formed on the receiving sidewall 28 surrounding the receiving groove 21 along the zigzag shape.

The receiving housing 30 may close the receiving groove 21 on other side facing the one side (26 of FIG. 8). A length of the receiving groove 21 in the receiving housing 30 may be greater than a length of the seating groove (71 of FIG. 4) in the seating housing (80 of FIG. 4).

Figure 5:
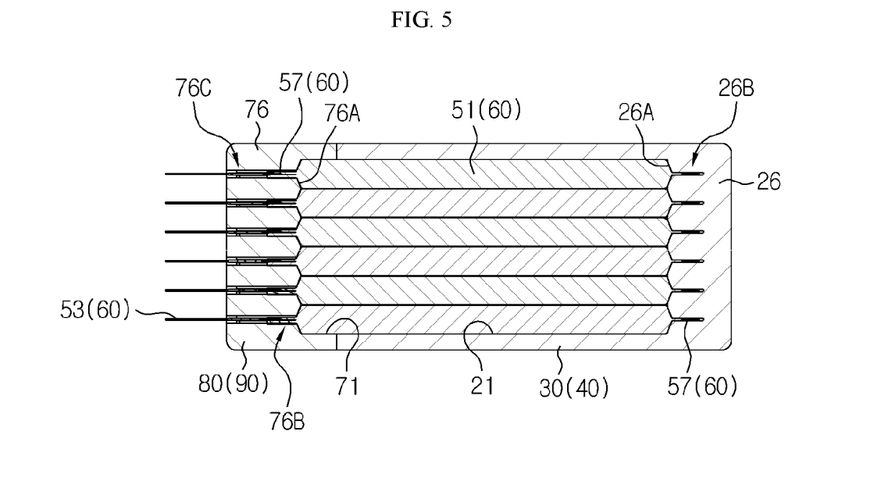
FIG. 5 is a cross sectional view illustrating the battery module taken on cutting plane line I-I' of FIG. 1.

The sidewall 28 of the receiving housing 30 may have a zigzag shape toward a ceiling 29 from a bottom 22 of the receiving housing 30 (FIGS. 3 and 5). Preferably, the sidewall 28 of the receiving housing 30 may include a first receiving sidewall 23 and a second receiving sidewall 24, which face each other through the receiving groove 21, and a third receiving sidewall 26 on other side facing the one side of the receiving housing 30.

In an example, the receiving structure 27 may have receiving sloped surfaces 23A, 24A, 26A positioned along the zigzag shape in the first receiving sidewall 23, the second receiving sidewall 24 and the third receiving sidewall 26, and receiving slits 23B, 24B, 26B respectively positioned on curved portions between the receiving sloped surfaces 23A, 24A, 26A. The receiving sloped surfaces 23A, 24A, 26A may be separated between the first receiving sidewall 23, the second receiving sidewall 24, and the third receiving sidewall 26.

Preferably, the receiving sloped surfaces 23A, 24A, 26A may be exposed to the receiving groove 21 so as to face the receiving groove 21. The receiving slits 23B, 24B, 26B may communicate fluidly with the receiving groove 21. The receiving sloped surface 23A of the first receiving sidewall 23 may have a same width as the receiving sloped surface 24A of the second receiving sidewall 24 and the receiving sloped surface 26A of the third receiving sidewall 26, at one level within the receiving groove 21.

A width between the first receiving sidewall 23 and the second receiving sidewall 24 may have a smaller size than a length of the receiving sloped surface 26A of the third receiving sidewall 26. Meanwhile, the battery cells 60 of FIG. 2 may be received in the receiving groove 21 and contact the receiving structure 27. Further, the electrode leads 53 of the battery cells 60 may be positioned toward one side of the receiving housing 30 and protrude from the receiving housing 30.

In an example, the electrode assembly 51 of the battery cell 60 may be positioned between two receiving sloped surfaces 23A defining one curved portion on the first receiving sidewall 23, between two receiving sloped surfaces 24A defining one curved portion on the second receiving sidewall 24, and between two receiving sloped surfaces 26A defining one curved portion on the third receiving sidewall 26.

The sealing part 58 of the battery cell 60 may be positioned in one receiving slit 23B of the first receiving sidewall 23, one receiving slit 24B of the second receiving sidewall 24, and one receiving slit 26B of the third receiving sidewall 26. More specifically, the sealing part 58 may be fit into the receiving slits 23B, 24B, 26B of the first receiving sidewall 23, the second receiving sidewall 24, and the third receiving sidewall 26 through the folded portion (55 of FIG. 2), and fit into the receiving slit 26B of the third receiving sidewall 26 through the flat portion (57 of FIG. 2), as illustrated in FIG. 5.

Referring to FIG. 4, the battery cover 90 may include the seating groove 71 within the seating housing 80, which is open toward the receiving groove 21 for seating the battery cells (60 of FIG. 2), and include the seating structure 77 along the zigzag shape on the seating sidewall 78 surrounding the seating groove 71.

The seating sidewall 78 of the seating housing 80 may have a zigzag shape from the bottom 72 of the seating housing 80 to the ceiling 79. The seating housing 80 may include a first seating sidewall 73 and a second seating sidewall 74, which face each other through the seating groove 71, and a third seating sidewall 76 facing an open surface of the seating groove 71.

In an example, the seating structure 77 may include seating sloped surfaces 73A, 74A, 76A positioned along the zigzag shape on the first seating sidewall 73, the second seating sidewall 74, and the third seating sidewall 76, and seating slits 73B, 74B, 76B respectively positioned on curved portions between the seating sloped surfaces 73A, 74A, 76A. The seating sloped surfaces 73A, 74A, 76A may be separated between the first seating sidewall 73, the second seating sidewall 74 and the third seating sidewall 76.

Preferably, the seating sloped surfaces 73A, 74A, 76A may be exposed to the seating groove 71 so as to face the seating groove 71. The seating slits 73B, 74B, 76B may communicate fluidly with the seating groove 71. The seating sloped surface 73A of the first seating sidewall 73 may have a same width as the seating sloped surface 74A of the second seating sidewall 74 and the seating sloped surface 76A of the third seating sidewall 76, at one level within the seating groove 71.

A width between the first seating sidewall 73 and the second seating sidewall 74 may have a smaller size than a length of the seating sloped surface 76A of the third seating sidewall 76. Further, the seating housing 80 may communicate fluidly with the seating slits 76B between the seating sloped surfaces 76A of the third seating sidewall 76 and additionally include the through holes 76C penetrating the third seating sidewall 76.

Meanwhile, the electrode assembly 51 of the battery cell 60 may be positioned between two seating sloped surfaces 73A defining one curved portion in the first seating sidewall 73, between two seating sloped surfaces 74A defining one curved portion in the second seating sidewall 74, and between two seating sloped surfaces 76A defining one curved portion in the third seating sidewall 76.

The sealing part 58 of the battery cell 60 may be positioned on one seating slit 73B of the first seating sidewall 73, one seating slit 74B of the second seating sidewall 74, and one seating slit 76B of the third seating sidewall 76. More specifically, the sealing part 58 may be fit into the seating slits 73B, 74B, 76B of the first seating sidewall 73, the second seating sidewall 74 and the third seating sidewall 76 through the folded portion 55, and fit into the seating slit 76B of the third seating sidewall 76 through the flat portion 57.

Further, the number of electrode leads 53s of the battery cells 60 may be same as the through holes 76C of the third seating sidewall 76 of the seating housing 80. Preferably, the electrode leads 53 may be respectively inserted into the through holes 76C through the seating slit 76B of the third seating sidewall 76, and protrude from the third seating sidewall 76.

Figure 6:
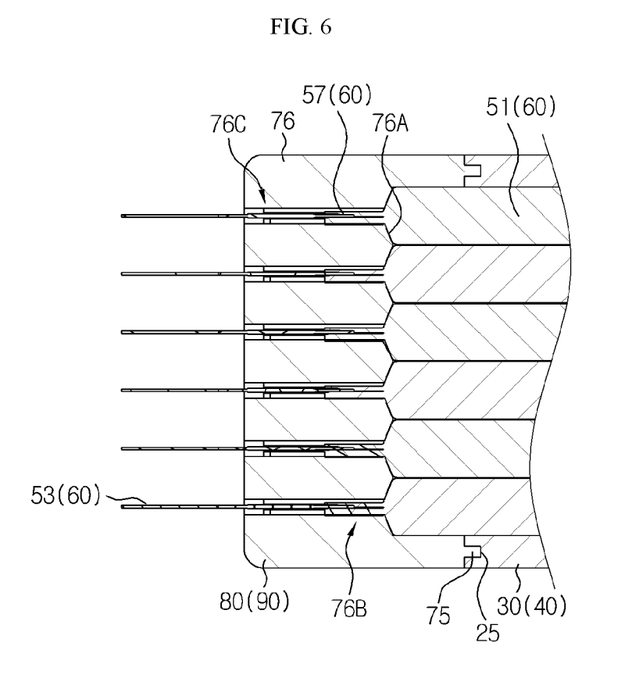
FIG. 6 is a view provided to explain another embodiment of the battery module of FIG. 5.

FIG. 5 is a cross sectional view illustrating the battery module taken on cutting plane line I-I' of FIG. 1, and FIG. 6 is a view provided to explain the battery module of FIG. 5 according to another embodiment.

Referring to FIG. 5, the battery receiving unit 40 and the battery cover 90 may surround the battery cells 60, while exposing the electrode leads 53 of the battery cells 60 externally. More specifically, the battery receiving unit 40 and the battery cover 90 may contact each other through the first and second receiving sidewalls 23, 24 of FIG. 3 and the first and second seating sidewalls 73, 74 of FIG. 4.

Meanwhile, as illustrated in FIG. 6, the battery receiving unit 40 and the battery cover 90 may include fitting parts 25, 75 for fitting with each other in a form of block coupling to provide more stable and convenient coupling when the battery receiving unit 40 and the battery cover 90 are coupled with each other. The fitting parts 25, 75 may include fitting groove 25s formed on the battery receiving unit 40, and fitting protrusions 75 formed on the battery cover 90 to be inserted into the fitting grooves 25. However, the exemplary embodiments may not be limited hereto. Accordingly, the fitting groove and fitting protrusion structure may also be configured such that the fitting protrusion may be formed on the battery receiving unit 40 and the fitting groove may be formed on the battery cover 90, or both the fitting groove and the fitting protrusion for coupling with each other may be formed on each of the battery receiving unit 40 and the battery cover 90.

Referring again to FIG. 5, the battery cells 60 may include the electrode assemblies 51 in the receiving grooves 21 and the seating grooves 71. The electrode assemblies 51 may be sequentially stacked in the receiving grooves 21 and the seating grooves 71. Preferably, the electrode assemblies 51 may contact the receiving sloped surfaces 26A of the third receiving sidewall 26 and the seating sloped surfaces 76A of the third seating sidewall 76.

Further, the battery cells 60 may include the flat portions 57 of the sealing parts (58 of FIG. 2) of the receiving slits 26B and the seating slits 76B on the curved portions between the receiving sloped surfaces 26A and the curved portions between the seating sloped surfaces 76A. Of course, although not illustrated in drawings, the battery cells 60 may include the folded portions 55 of the sealing parts 58 also in the receiving slits 23B, 24B of the first and second receiving sidewalls 23, 24 and the seating slits 73B, 74B of the first and second seating sidewalls 73A, 74A.

Meanwhile, the electrode leads 53 of the battery cells 60 may extend via the slits 76B of the third seating sidewalls 76 of the seating housing 80, to be inserted into the through holes 76C of the third seating sidewall 76, and then protruded from the through holes 76C.

Next, a method for fabricating a battery module according to the present disclosure will be described with reference to drawings.

Referring to FIGS. 1 to 2, the battery receiving unit 40, the battery cells 60 and the battery cover 90 may be prepared. The battery receiving unit 40 may include the receiving groove 21 positioned within the receiving housing 30, which is open to one side of the receiving housing 30. Preferably, the battery receiving unit 40 may have a zigzag shape on the sidewall 28.

The battery cells 60 may be partially received by the receiving groove 21 of the receiving housing 30. In this case, the electrode assembly 51 of the battery cell 60 and a portion of the sealing part 58 may contact the sidewall 28 having the zigzag shape in the receiving housing 30. Because the battery cells 60 include the electrode leads 53 which are unidirectional, the electrode leads 53 may be exposed from the receiving housing 30.

The battery cover 90 may contact the battery receiving unit 40. That is, the battery receiving unit 40 and the battery cover 90 may contact each other through the sidewalls 28, 78. In this case, the battery cover 90 may include the seating groove 71 which is positioned within the seating housing 80 and open to the receiving housing 30 (see FIG. 4). Preferably, the battery cover 90 may have a zigzag shape on the sidewall 78.

Meanwhile, the battery cells 60 may be partially received in the seating groove 71 of the seating housing 80. In this case, the electrode assembly 51 of the battery cell 60 and the other portion of the sealing part 58 may contact the zigzag-shaped sidewall 78 of the seating housing 80. In this case, the electrode leads 53 of the battery cells 60 may penetrate the seating housing 80 and protrude from the through holes 76C of the seating housing 80.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A battery module, comprising:
    a battery receiving unit comprising a receiving groove positioned within a receiving housing, the receiving housing having a receiving structure along a zigzag shape of a receiving sidewall surrounding the receiving groove, wherein the battery receiving unit is open to one side of the receiving housing;
    battery cells received in the receiving groove and contacting the receiving structure, and comprising electrode leads positioned toward the one side of the receiving housing and protruding from the receiving housing; and
    a battery cover comprising a seating groove formed within a seating housing, the seating housing having a seating structure along a zigzag shape of a seating sidewall surrounding the seating groove, wherein the battery cover is open to the receiving groove for seating the battery cells,
    wherein the seating housing covers the one side of the receiving housing and is penetrated with the electrode leads such that the battery cells except for the electrode leads are completely enclosed by the seating housing and the receiving housing.

2. The battery module of claim 1, wherein the receiving housing closes the receiving groove on other side facing the one side.

3. The battery module of claim 1, wherein a length of the receiving groove of the receiving housing is greater than a length of the seating groove of the seating housing.

4. The battery module of claim 1, wherein the receiving sidewall of the receiving housing has the zigzag shape from a bottom of the receiving housing to a ceiling.

5. The battery module of claim 1, wherein the receiving sidewall of the receiving housing comprises a first receiving sidewall and a second receiving sidewall, which face each other through the receiving groove, and a third receiving sidewall on other side facing the one side of the receiving housing, and
    the receiving structure comprises receiving sloped surfaces positioned along the zigzag shape of the first receiving sidewall, the second receiving sidewall and the third receiving sidewall, and receiving slits respectively positioned on curved portions between the receiving sloped surfaces.

6. The battery module of claim 5, wherein the receiving sloped surfaces are separated between the first receiving sidewall, the second receiving sidewall and the third receiving sidewall.

7. The battery module of claim 5, wherein the receiving sloped surface of the first receiving sidewall has a same width as the receiving sloped surface of the second receiving sidewall and the receiving sloped surface of the third receiving sidewall, at one level within the receiving groove.

8. The battery module of claim 5, wherein a width between the first receiving sidewall and the second receiving sidewall has a smaller size than a length of the receiving sloped surface of the third receiving sidewall.

9. The battery module of claim 5, wherein the receiving sloped surfaces are exposed to the receiving groove so as to face the receiving groove, and the receiving slits communicate fluidly with the receiving groove.

10. The battery module of claim 5, wherein the battery cells position an electrode assembly between two receiving sloped surfaces defining one curved portion in each of the first receiving sidewall, the second receiving sidewall and the third receiving sidewall, and comprise a sealing part in one receiving slit.

11. The battery module of claim 10, wherein the sealing part is fit into the receiving slits of the first receiving sidewall, the second receiving sidewall and the third receiving sidewall through a folded portion, and fit into the receiving slits of the third receiving sidewall through a flat portion.

12. The battery module of claim 1, wherein the seating sidewall of the seating housing has the zigzag shape from a bottom of the seating housing to a ceiling.

13. The battery module of claim 1, wherein the seating housing comprises a first seating sidewall and a second seating sidewall, which face each other through the seating groove, and a third seating sidewall facing an open surface of the seating groove, and
    the seating structure comprises seating sloped surfaces positioned along the zigzag shape on the first seating sidewall, the second seating sidewall and the third seating sidewall, and seating slits respectively positioned on curved portions between the seating sloped surfaces.

14. The battery module of claim 1, wherein the battery receiving unit and the battery cover are formed of a natural rubber, a synthetic rubber, an elastomer, or a plastomer.

15. The battery module of claim 1, wherein the battery receiving unit and the battery cover are formed of a metal material.

* * * * *